(12) United States Patent
Yamashita

(10) Patent No.: US 12,105,026 B2
(45) Date of Patent: Oct. 1, 2024

(54) IMAGE ACQUISITION METHOD AND IMAGE ACQUISITION APPARATUS

(71) Applicant: NuFlare Technology, Inc., Yokohama (JP)

(72) Inventor: Yasuhiro Yamashita, Yokohama (JP)

(73) Assignee: NuFlare Technology, Inc., Yokohama (JP)

( * ) Notice: Subject to any disclaimer, the term of this patent is extended or adjusted under 35 U.S.C. 154(b) by 338 days.

(21) Appl. No.: 17/805,773

(22) Filed: Jun. 7, 2022

(65) Prior Publication Data

US 2023/0009656 A1 Jan. 12, 2023

(30) Foreign Application Priority Data

Jul. 8, 2021 (JP) ................. 2021-113513

(51) Int. Cl.
*G01N 21/88* (2006.01)
*G01N 21/956* (2006.01)
*G06T 7/00* (2017.01)

(52) U.S. Cl.
CPC ... *G01N 21/8806* (2013.01); *G01N 21/95607* (2013.01); *G06T 7/001* (2013.01); *G01N 2021/8835* (2013.01); *G06T 2207/30148* (2013.01)

(58) Field of Classification Search
CPC ........ G01N 21/8806; G01N 2021/8835; G06T 7/001; G06T 2207/30148
USPC ....................................................... 382/144
See application file for complete search history.

(56) References Cited

U.S. PATENT DOCUMENTS

| | | | |
|---|---|---|---|
| 2003/0025065 A1 | 2/2003 | Hashimoto | |
| 2006/0083420 A1* | 4/2006 | Kawaguchi | ............... G06T 5/92 382/149 |

FOREIGN PATENT DOCUMENTS

| | | |
|---|---|---|
| JP | 2003-32435 A | 1/2003 |
| JP | 2020-42035 A | 3/2020 |
| JP | 2020-56638 A | 4/2020 |

* cited by examiner

Primary Examiner — Thanh Luu
(74) Attorney, Agent, or Firm — Oblon, McClelland, Maier & Neustadt, L.L.P.

(57) ABSTRACT

An image acquisition method includes storing a coefficient of a relational expression between a parameter corresponding to a light quantity incident on an imaging sensor including a photo sensor element and an output value of the imaging sensor in the case of the light incident on the imaging sensor which employs a reference image accumulation time, inputting a desired image accumulation time, and calculating a parameter for obtaining a desired output value of the imaging sensor by using a corrected relational expression obtained by correcting using an output value of the imaging sensor employing the desired image accumulation time in the case of the incident light quantity being zero, adjusting the light quantity incident on the imaging sensor to be a calculated parameter, and acquiring a target image by the imaging sensor on which an adjusted light quantity is incident, and outputting data of the acquired image.

10 Claims, 10 Drawing Sheets

IMAGE ACQUISITION METHOD AND IMAGE ACQUISITION APPARATUS

CROSS-REFERENCE TO RELATED APPLICATION

This application is based upon and claims the benefit of priority from prior Japanese Patent Application No. 2021-113513 filed on Jul. 8, 2021 in Japan, the entire contents of which are incorporated herein by reference.

BACKGROUND OF THE INVENTION

Field of the Invention

Embodiments of the present invention relate to an image acquisition method and an image acquisition apparatus. For example, they relate to an apparatus and method for acquiring an image of a pattern on an exposure mask used in semiconductor manufacturing.

Description of Related Art

With recent progress in high integration and large capacity of the LSI (Large Scale Integrated circuits), the line width (critical dimension) required for circuits of semiconductor elements is becoming increasingly narrower. Such semiconductor elements are manufactured through circuit-forming by exposing and transferring a pattern onto a wafer by means of a reduced projection exposure apparatus known as a stepper, using an original or "master" pattern (also called a mask or a reticle, hereinafter generically referred to as a mask) on which a circuit pattern has been formed.

Since LSI manufacturing requires an enormous production cost, it is essential to improve the yield. One of major factors that decrease the yield of the LSI manufacturing is due to pattern defects on a mask for exposing/transferring an ultrafine pattern onto a semiconductor wafer by the photolithography technology. In recent years, with miniaturization of dimensions of LSI patterns formed on a semiconductor wafer, dimensions to be detected as a pattern defect have become extremely small. Therefore, the pattern inspection apparatus for inspecting defects of a transfer mask used in manufacturing LSI needs to be highly accurate.

As an inspection method, for example, there is "die-to-die inspection" or "die-to-database inspection". The "die-to-die inspection" method compares data of optical images of identical patterns at different positions on the same mask. The "die-to-database inspection" method inputs, into an inspection apparatus, writing data (design data) generated by converting pattern-designed CAD data to a writing apparatus specific format to be input to the writing apparatus when a pattern is written on the mask, generates a reference image based on the input writing data, and compares the generated reference image with an optical image being measured target data obtained by imaging the pattern.

In order to perform pattern inspection, a pattern image needs to be acquired. As for an imaging sensor, the larger the incident light quantity, the larger the gray scale value to be output, and the smaller the incident light quantity, the smaller the gray scale value to be output. Therefore, before performing inspection, the inspection light quantity to be incident on the imaging sensor is adjusted so that an image of a gray scale value being optimal for inspection may be obtained.

In the imaging sensor, there is arranged a photo sensor element, and after setting the image accumulation time of the element to be a predetermined time, patterns are imaged. However, in some cases, the image accumulation time of the element is preferably to be changed depending on the inspection target object, inspection conditions and the like. If the image accumulation time of the element of the imaging sensor is doubled under a constant light quantity, the gray scale value to be output should be twice since the information amount on the incident light is doubled. Therefore, if the image accumulation time of the element has been doubled, it should be appropriate to set the light quantity to be one-half in order to obtain the same gray scale value. Then, with respect to the image accumulation time of the element serving as a reference, the relation between an incident light quantity and an output value of the imaging sensor is measured. In the case of changing the image accumulation time of the element, there is examined a method of calculating, based on such relation, a necessary light quantity.

However, if the light quantity is simply changed according to the ratio with respect to the image accumulation time, a problem occurs that the output value of the imaging sensor has an error. This causes a problem of accuracy degradation of an acquired image. Further, if an error occurs in the output value of the imaging sensor, a pseudo defect is generated in a pattern defect inspection.

Although not relating to a pattern inspection apparatus for a mask and the like, there is disclosed to shorten the accumulation time of a sensor of an image recognition apparatus, which recognizes a photographic subject such as a finger and a bar code, when the ambient temperature is high (e.g., refer to Japanese Patent Application Laid-open (JP-A) No. 2003-032435).

BRIEF SUMMARY OF THE INVENTION

According to one aspect of the present invention, an image acquisition method includes storing, in a storage device, a coefficient of a relational expression between a parameter value corresponding to a quantity of light incident on an imaging sensor including a photo sensor element and an output value of the imaging sensor in a case of the light incident on the imaging sensor which employs a reference image accumulation time serving as a reference of an image accumulation time of the photo sensor element;

inputting a desired image accumulation time, and calculating a parameter value for obtaining a desired output value of the imaging sensor by using a corrected relational expression which is obtained by correcting the relational expression by using an output value of the imaging sensor employing the desired image accumulation time in a case of the quantity of light incident being zero;

adjusting the quantity of light incident on the imaging sensor to be a calculated parameter value; and acquiring an image of a target object by the imaging sensor on which an adjusted quantity of light is incident, and outputting image data of the image acquired.

According to another aspect of the present invention, an image acquisition apparatus includes an imaging sensor configured to include a photo sensor element;

a storage device configured to store a coefficient of a relational expression between a parameter value corresponding to a quantity of light incident on the imaging sensor and an output value of the imaging sensor in a case of the light incident on the imaging sensor which employs a reference image accumulation time serving as a reference of an image accumulation time of the photo sensor element;

a parameter value calculation circuit configured to input a desired image accumulation time, and to calculate a parameter value for obtaining a desired output value of the imaging sensor by using a corrected relational expression which is obtained by correcting the relational expression by using an output value of the imaging sensor employing the desired image accumulation time in a case of the quantity of light incident being zero; and a light quantity adjustment mechanism configured to adjust the quantity of light incident on the imaging sensor to be a calculated parameter value, wherein an image of a target object is acquired by the imaging sensor on which an adjusted quantity of light is incident, and image data of the image acquired is output.

DETAILED DESCRIPTION OF THE INVENTION

Hereinafter, embodiments of the present invention describe an image acquisition method and apparatus capable of adjusting the light quantity of an inspection light incident on an imaging sensor so that an image of a desired gray scale value may be acquired with respect to the image accumulation time of a desired element.

First Embodiment

Figure 1:
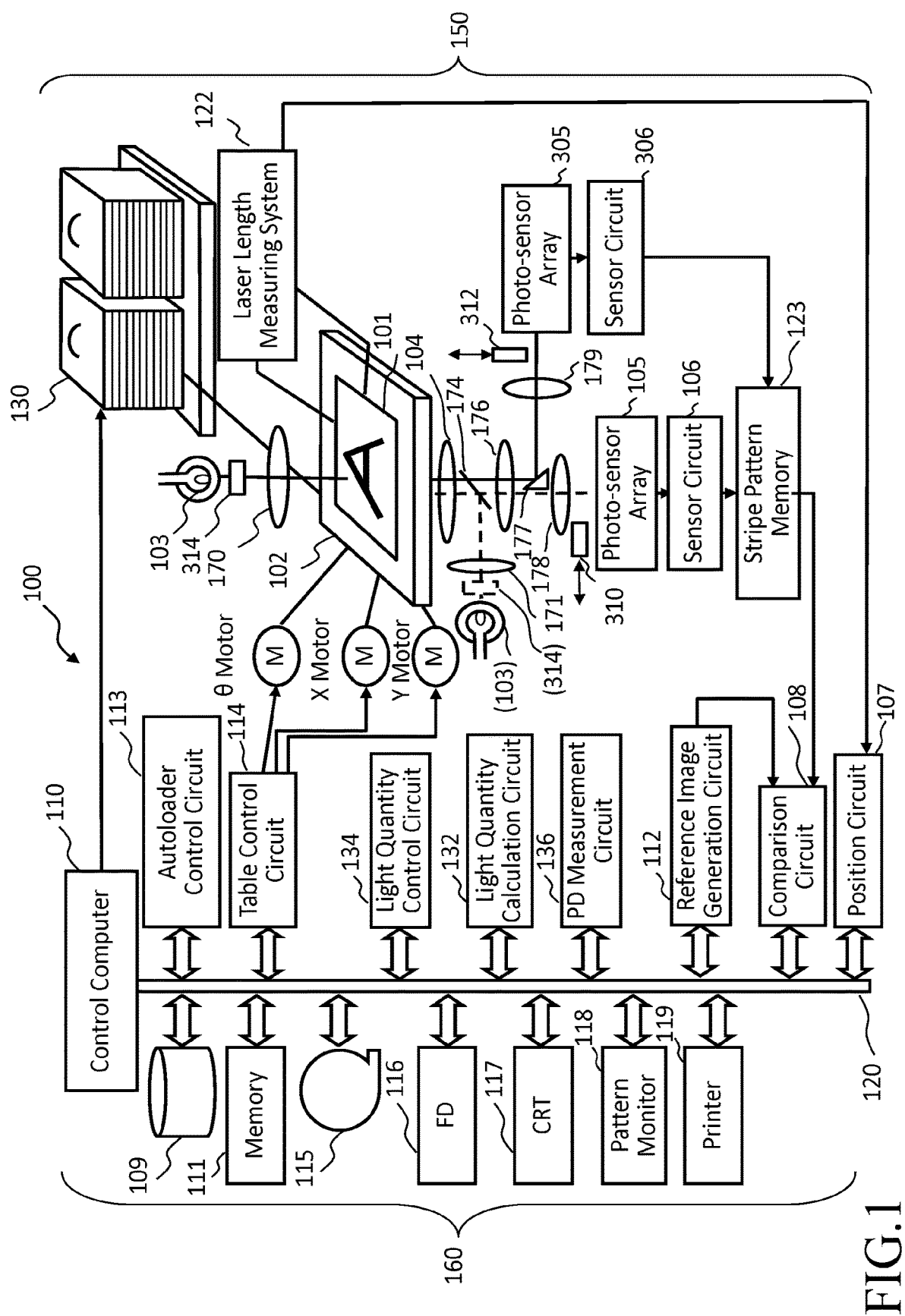
FIG. 1 is a configuration diagram showing a pattern inspection apparatus according to a first embodiment.

FIG. 1 is a configuration diagram showing a pattern inspection apparatus according to a first embodiment. As shown in FIG. 1, an inspection apparatus 100 that inspects defects of a pattern formed on an inspection target substrate, such as a mask, includes an optical image acquisition mechanism 150 and a control system circuit 160.

The optical image acquisition mechanism 150 includes a light source 103, a light quantity adjustment mechanism 314, a transmitted illumination optical system 170, a reflected illumination optical system 171, an XYθ table 102 movably arranged, a magnifying optical system 104, a beam splitter 174, an image forming optical system 176, a mirror 177, an image forming optical system 178, an image forming optical system 179, photo sensor arrays 105 and 305, sensor circuits 106 and 306, photoelectric sensors (PD) 310 and 312, a stripe pattern memory 123, a laser length measuring system 122, and an autoloader 130. When conducting only a transmission inspection using a transmitted light (when not conducting a reflection inspection), the photo sensor array 105, the sensor circuit 106, the reflected illumination optical system 171, the image forming optical system 178, the photoelectric sensor 310, and the beam splitter 174 may be omitted. When conducting only a reflection inspection using a reflected light (when not conducting a transmission inspection), the photo sensor array 305, the sensor circuit 306, the transmitted illumination optical system 170, the image forming optical system 179, and the photoelectric sensor 312 may be omitted.

On the XYθ table 102, there is placed a substrate 101 conveyed from the autoloader 130. The substrate 101 is, for example, an exposure photomask used for transfer printing a pattern onto a semiconductor substrate such as a wafer. A plurality of figure patterns to be inspected are formed on the photomask. The substrate 101 is disposed, for example, with its pattern-forming surface facing downward, on the XYθ table 102.

As each of the photo sensor arrays 105 and 305 (an example of the imaging sensor), it is preferable to use a TDI (time delay integration) sensor, for example. The TDI sensor includes a plurality of photo sensor elements arrayed two-dimensionally. Alternatively, as each of the photo sensor arrays 105 and 305, for example, a line sensor including a plurality of photo sensor elements arranged one-dimensionally may be used. When each photo sensor element acquires an image, a predetermined image accumulation time (or called a "scanning time". The same applies below.) is set. Outputs of a plurality of photo sensor elements arrayed in a scanning direction are integrated and output from the TDI sensor. The plurality of photo sensor elements arrayed in a scanning direction acquire images of the same pixel while shifting the time according to the movement of the XYθ table 102.

Each of the PDs 310 and 312 is arranged movable in the direction perpendicular to the optical axis by a drive mechanism (not shown). In other words, each of the PDs 310 and 312 moves between the inside and the outside of the optical path.

In the control system circuit 160, a control computer 110 which controls the whole of the inspection apparatus 100 is connected, through a bus 120, to a position circuit 107, a comparison circuit 108, a reference image generation circuit 112, an autoloader control circuit 113, a table control circuit 114, a PD measurement circuit 136, a light quantity calculation circuit 132, a light quantity control circuit 134, a magnetic disk drive 109, a memory 111, a magnetic tape drive 115, a flexible disk drive (FD) 116, a CRT 117, a pattern monitor 118, and a printer 119. The sensor circuits 106 and 306 are connected to the stripe pattern memory 123 which is connected to the comparison circuit 108. The XYθ table 102 is driven by the x, y, and θ-axis motors, and serves as an example of the stage. The reference image generation circuit 112 is connected to the comparison circuit 108.

Each " . . . circuit", such as the position circuit 107, the comparison circuit 108, the reference image generation circuit 112, the autoloader control circuit 113, the table control circuit 114, the PD measurement circuit 136, the light quantity calculation circuit 132, and the light quantity control circuit 134 includes processing circuitry. The processing circuitry includes, for example, an electric circuit, computer, processor, circuit board, quantum circuit, semiconductor device, or the like. Common processing circuitry (the same processing circuitry), or different processing circuitry (separate processing circuitry) may be used for each "circuit". For example, each " . . . circuit", such as the position circuit 107, the comparison circuit 108, the reference image generation circuit 112, the autoloader control circuit 113, the table control circuit 114, the PD measurement circuit 136, the light quantity calculation circuit 132, and the light quantity control circuit 134 may be configured and executed by the control computer 110. Input data necessary for the position circuit 107, the comparison circuit 108, the reference image generation circuit 112, the autoloader control circuit 113, the table control circuit 114, the PD measurement circuit 136, the light quantity calculation circuit 132, and the light quantity control circuit 134, and operated (calculated) results are stored in a memory (not shown) in each circuit or the memory 111 each time. Input data necessary for the control computer 110 and operated (calculated) results are stored in a memory (not shown) in the control computer 110, or the memory 111 each time. A program for causing a computer or a processor to execute processing or the like may be stored in a recording medium, such as the magnetic disk drive 109, the magnetic tape drive 115, the FD 116, the ROM (Read Only Memory), or the like.

The light quantity adjustment mechanism 314 is configured by, for example, a light-shielding shutter and a combination of a plurality of filter elements having different transmittances. The light-shielding shutter is arranged to shield inspection lights from the light source 103. By adjusting the combination of a plurality of filter elements to be arranged, the light quantity which transmits the light quantity adjustment mechanism 314 is adjusted. By this, the quantity of light which reaches the photo sensor array 105 (305) is adjusted. The light quantity adjustment mechanism 314 is controlled by the light quantity control circuit 134.

In the inspection apparatus 100, a transmission inspection optical system of high magnification is configured by the light source 103, the light quantity adjustment mechanism 134, the transmitted illumination optical system 170, the XYθ table 102, the magnifying optical system 104, the image forming optical system 176, the mirror 177, the image forming optical system 179, and the photo sensor array 305. A reflection inspection optical system of high magnification is configured by the light source 103, the light quantity adjustment mechanism 134, the reflected illumination optical system 171, the beam splitter 174, the magnifying optical system 104, the XYθ table 102, the image forming optical system 176, the image forming optical system 178, and the photo sensor array 105.

The XYθ table 102 is driven by the table control circuit 114 under the control of the control computer 110. The XYθ table 102 can be moved by a drive system such as a three-axis (X, Y, and θ) motor which drives the table in the directions of x, y, and θ. For example, a step motor can be used as each of these X, Y, and θ motors. The XYθ table 102 is movable in the horizontal direction and the rotation direction by the X-, Y-, and θ-axis motors. The movement position of the substrate 101 placed on the XYθ table 102 is measured by the laser length measuring system 122, and supplied to the position circuit 107. The transfer (feed) processing of the substrate 101 from the autoloader 130 to the XYθ table 102, and from the XYθ table 102 to the autoloader 130 is controlled by the autoloader control circuit 113.

Writing data (design data) used as a basis for forming patterns on the inspection substrate 101 is input from the outside of the inspection apparatus 100, and stored in the magnetic disk drive 109. The writing data defines a plurality of figure patterns, and each figure pattern is usually configured by combining a plurality of element figures. Such a figure pattern may be configured by one figure. Then, each pattern corresponding to and based on each figure pattern defined by the writing data is formed on the inspection substrate 101.

FIG. 1 shows configuration elements necessary for describing the first embodiment. It should be understood that other configuration elements generally necessary for the inspection apparatus 100 may also be included therein.

Figure 2:
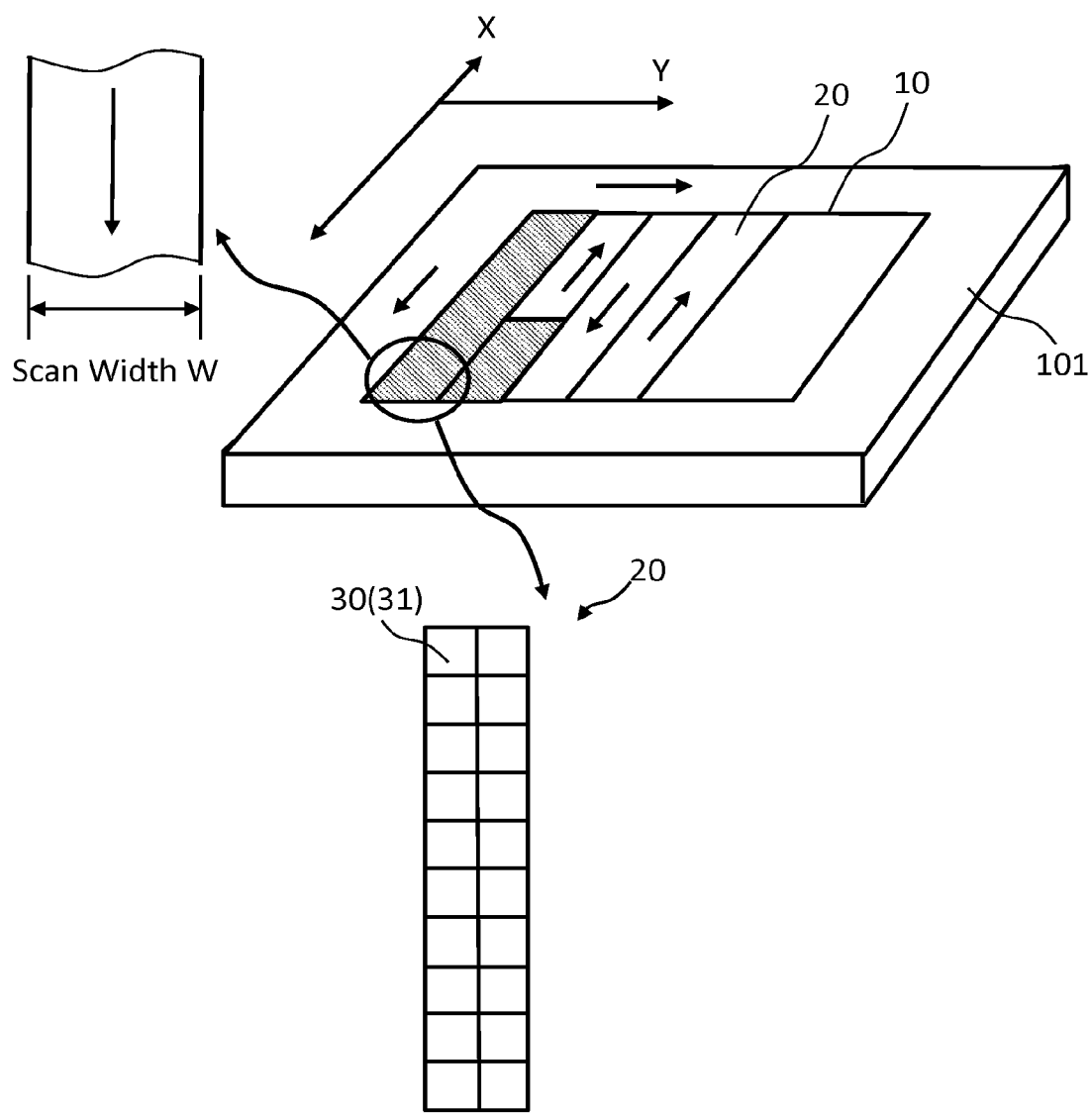
FIG. 2 is a conceptual diagram illustrating an inspection region according to the first embodiment.

FIG. 2 is a conceptual diagram illustrating an inspection region according to the first embodiment. As shown in FIG. 2, an inspection region 10 (the entire inspection region) of the substrate 101 is virtually divided into a plurality of strip-shaped inspection stripes 20 each having a width W in the y direction, for example, where the width W is a scan width of the TDI sensor 105. The inspection apparatus 100 acquires an image (stripe region image) for each inspection stripe 20. Specifically, with respect to each of the inspection stripes 20, the inspection apparatus 100 captures (acquires) an image of a figure pattern arranged in the stripe region concerned, with a laser light (inspection light), imaging in the longitudinal direction (the x direction) of the stripe region concerned. In order to prevent a missing image, it is preferable that a plurality of inspection stripes 20 are set such that adjacent inspection stripes 20 overlap with each other by a predetermined margin width.

The photo sensor arrays 105 and 305 that continuously move relatively in the x direction by the movement of the XYθ table 120 acquire optical images. The photo sensor arrays 105 and 305 continuously capture optical images each having a scan width W as shown in FIG. 2. In other words, in the case where the photo sensor arrays 105 and 305 are TDI sensors, they capture optical images of a plurality of figure patterns formed on the substrate 101 while moving relatively in the integrated direction of the photo sensor arrays 105 and 305. In the case where the photo sensor arrays 105 and 305 are line sensors, they capture optical images of a plurality of figure patterns formed on the substrate 101 while moving relatively in the direction perpendicular to the arrangement direction of a plurality of photo sensor elements. In the first embodiment, after capturing (acquiring) an optical image in one inspection stripe 20, the photo sensor arrays 105 and 305 move in the y direction to the position of the next inspection stripe 20, and similarly capture another optical image having the scan width W continuously while moving in the direction reverse to the last image capturing direction. Thereby, the image capturing is repeated in the forward(FWD) and backward (BWD) directions, namely changing the direction reversely when advancing and returning.

In an actual inspection, as shown in FIG. 2, the stripe region image of each inspection stripe 20 is divided into images of a plurality of rectangular (including square) frame regions 30. Then, inspection is performed for each image of the frame region 30. For example, it is divided into the size of 512×512 pixels. Therefore, a reference image to be compared with a frame image 31 of the frame region 30 is similarly generated for each frame region 30.

The direction of the image capturing is not limited to repeating the forward(FWD) and backward(BWD) movement. Images may be captured in a fixed one direction. For example, FWD and FWD may be repeated, or alternatively, BWD and BWD may be repeated.

Figure 3:
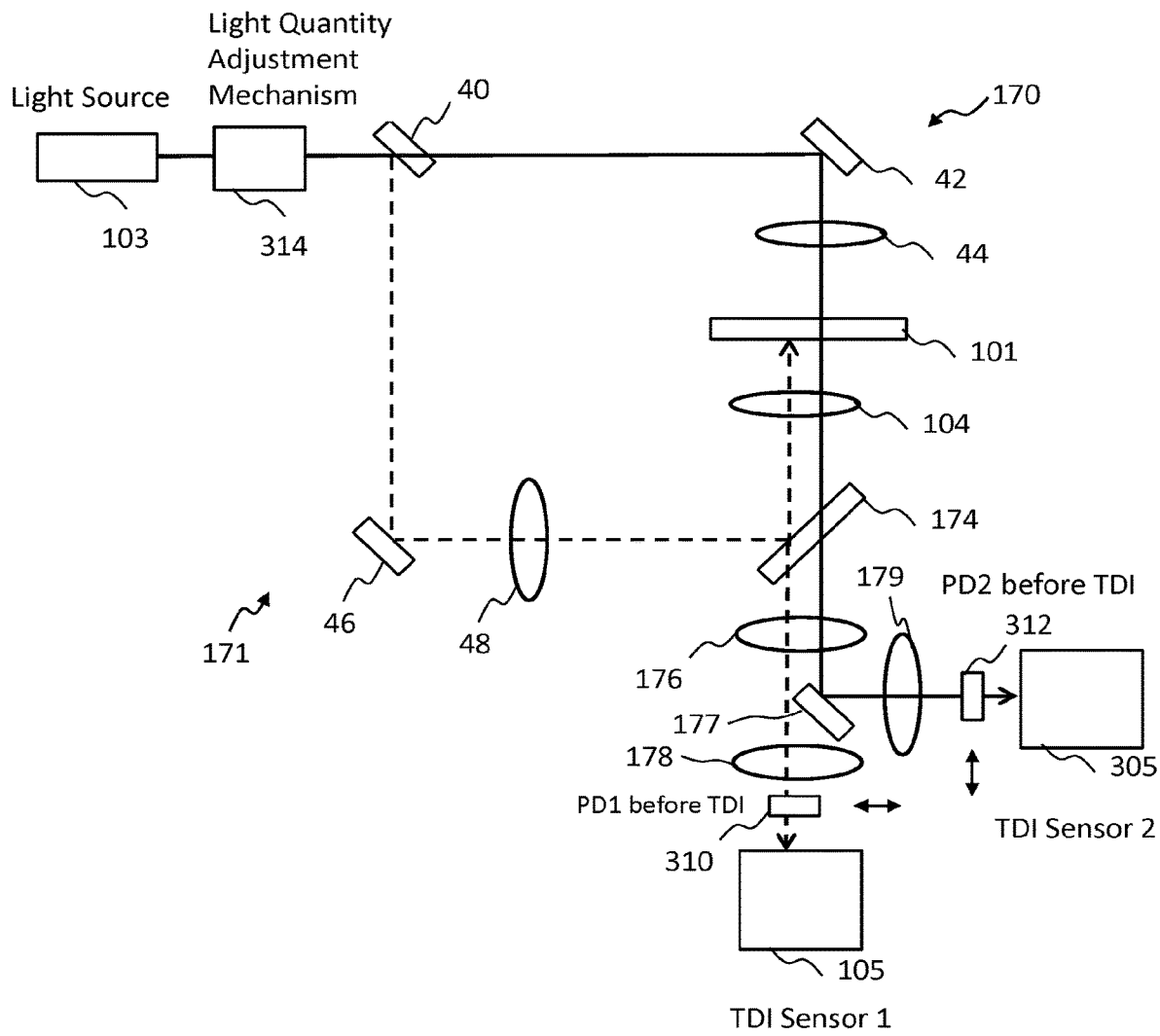
FIG. 3 is an illustration describing a method for adjusting a light quantity according to the first embodiment.

FIG. 3 is an illustration describing a method for adjusting a light quantity according to the first embodiment. In FIG. 3, the transmitted illumination optical system 170 includes a mirror 42 and a lens 44. The reflected illumination optical system 171 includes a beam splitter 40, a mirror 46, and a lens 48. An inspection light output from the light source 103 passes through the light quantity adjustment mechanism 314, and enters the beam splitter 40. Then, the inspection light is divided into an inspection light for transmission inspection, and an inspection light for reflection inspection by the beam splitter 40.

The inspection light for transmission inspection is reflected by the mirror 42, and illuminates the substrate 101 on the XYθ table 102 from the upper surface side by the lens 44. The transmitted light having passed through the substrate enters the image forming optical system 176 via the magnifying optical system 104 and the beam splitter 174. The image forming optical system 176 forms an image of a transmitted light on the position of the mirror 177. The transmitted light reflected by the mirror 177 is focused to form an image on the photo sensor array 305 by the image forming optical system 179.

On the other hand, the inspection light for reflection inspection is reflected by the mirror 46, and enters the beam splitter 174 by the lens 48. Then, it is reflected by the beam splitter 174, and enters the magnifying optical system 104. The inspection light for reflection inspection illuminates the substrate 101 on the XYθ table 102 from the backside by the magnifying optical system 104. At this process, the inspection light for reflection inspection illuminates a position shifted a little from the inspection light for transmission inspection. The reflected light reflected from the substrate 101 enters the image forming optical system 176 through the magnifying optical system 104 and the beam splitter 174. The image forming optical system 176 forms, in the vicinity of the mirror 177, an intermediate image of the reflected light, and makes the reflected light enter the image forming optical system 178. Then, the reflected light is focused to form an image on the photo sensor array 105 by the image forming optical system 178.

If, whenever the light quantity is adjusted, images are acquired by the photo sensor arrays 105 and 305 and the acquired images are checked, it takes time to perform processing. Therefore, a PD 310 is arranged in the optical path of light just before incident on the photo sensor array 105. Similarly, a PD 312 is arranged in the optical path of light just before incident on the photo sensor array 305. Then, light quantities are measured by the PDs 310 and 312, and adjusted to be desired light quantities by the light quantity adjustment mechanism 314. Further, the relation is measured in advance between an output of the PD 310 and a gray scale value imaged by the photo sensor array 105 where the image accumulation time of an element serving as a reference has been set, and output from the sensor circuit 106. Similarly, the relation is measured in advance between an output of the PD 312 and a gray scale value imaged by the photo sensor array 305 where the image accumulation time of an element serving as a reference has been set, and output from the sensor circuit 306.

Figure 4:
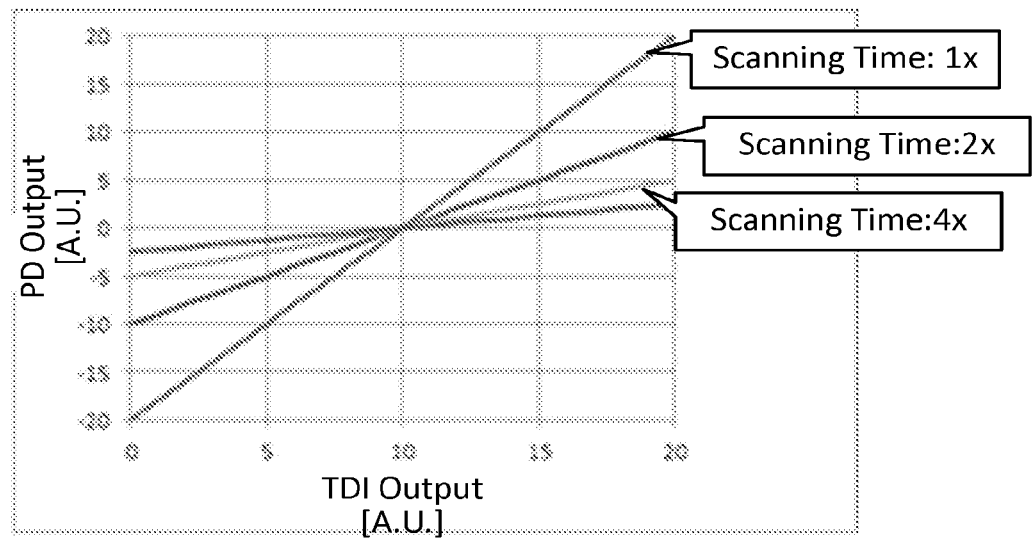
FIG. 4 is a graph showing an example of a relation between a PD output and a TDI sensor output with respect to an image accumulation time of an element serving as a reference according to a comparative example of the first embodiment.

FIG. 4 is a graph showing an example of a relation between a PD output and a TDI sensor output with respect to an image accumulation time of an element serving as a reference according to a comparative example of the first embodiment. In FIG. 4, the ordinate axis indicates a PD output, and the abscissa axis indicates a TDI sensor output. Although the state of the PD output being negative is also illustrated, it is for virtually extending the straight line in order to show the intercept at the ordinate axis of a linear (first order) proportional function. The TDI sensor output here indicates a gray scale value imaged by the photo sensor array 105 (305), and output from the sensor circuit 106 (306). In FIG. 4, the image accumulation time of the element serving as a reference is indicated by the scanning time 1×. The comparative example of FIG. 4 shows, with respect to the image accumulation time of the element serving as a reference, an example of a result of measuring, by experiment and the like, a relation between an output of the PD and an output of the TDI sensor where the image accumulation time of the element serving as a reference has been set. In the case where the image accumulation time of the element serving as a reference has been set, the light quantity adjustment mechanism 314 adjusts the light quantity by using the linear proportional function shown by the scanning time 1× so that a PD output may be the one which gives a desired gray scale value. In the case where the dynamic range of the TDI sensor output is defined by, for example, 256 gray scale levels, the light quantity is adjusted such that the gray scale value of a white portion (glass portion) is, for example, 200 in a transmission inspection, for example. Alternatively, the light quantity is adjusted such that the gray scale value of a black portion (light shielding film portion) is, for example, 200 in a reflection inspection, for example.

As described above, the photo sensor arrays 105 and 305 acquire images of patterns after setting the image accumulation time of the element to be a predetermined time. However, in some cases, the image accumulation time of the element is preferably to be changed depending on the inspection target object, inspection conditions and the like. If the image accumulation time of the element of the photo sensor arrays 105 and 305 is increased to be twice the reference image accumulation time of the element under a constant light quantity, the gray scale value to be output should be twice since the information amount on the incident light is doubled. Accordingly, if the image accumulation time of the element has been twice the reference image accumulation time of the element, it should be appropriate to set the light quantity to be one-half in order to obtain the same gray scale value. Therefore, in the comparative example of FIG. 4, with respect to the scanning time 2× obtained by doubling the image accumulation time of the element, the linear proportional function shown by the scanning time 2× is defined such that the PD output becomes one-half of that of the linear proportional function shown by the scanning time 1×. Thus, in the linear proportional function shown by the scanning time 2×, the coefficient indicating the gradient is set to be one-half of that of the linear proportional function of the scanning time 1×, and the coefficient indicating the intercept is set to be one-half of that of the scanning time 1×.

Similarly, in the comparative example of FIG. 4, with respect to the scanning time 4× obtained by quadrupling the image accumulation time of the element, the linear proportional function shown by the scanning time 4× is defined such that the PD output becomes one-fourth of that of the linear proportional function shown by the scanning time 1×. Thus, in the linear proportional function shown by the scanning time 4×, the coefficient indicating the gradient is set to be one-fourth of that of the linear proportional function of the scanning time 1×, and the coefficient indicating the intercept is set to be one-fourth of that of the scanning time 1×.

For example, in the case of changing the image accumulation time of the element from t1 to t2, the PD output E with respect to the TDI output I is defined by the following equation (1) applying the gradient a and the intercept b of the linear proportional function used when the image accumulation time of the element is t1.

$$E=a(t1/t2)\cdot I+b(t1/t2) \qquad (1)$$

In the comparative example, when changing the image accumulation time of the element from the scanning time 1× to the scanning time 2× being twice the time 1×, the light quantity adjustment mechanism 314 adjusts, using the linear proportional function shown by the obtained scanning time 2×, the light quantity so that a PD output may be the one which gives a desired gray scale value. By this, the light quantity adjustment should have been completed.

However, if the light quantity is simply changed according to the ratio with respect to the image accumulation time of the element, a problem occurs that the output value after changing the gray scale value of the photo sensor array 105 (305) including a TDI sensor has an error. This causes a problem of accuracy degradation of an acquired image. Further, if an error occurs in the output value after changing the gray scale value of the photo sensor array 105 (305) including a TDI sensor, a pseudo defect is generated in a pattern defect inspection.

As characteristics of the photo sensor array 105 (305) including a TDI sensor, it outputs, under the influence of a dark current, a certain gray scale value even when it irradiates no laser beam. In the comparative example of FIG. 4, the TDI output value is a finite value when the PD output is zero. The longer the image accumulation time of the element, the more the dark current. Therefore, in each image accumulation time of the element, an error occurs by defining the TDI output under a dark current to be the same value, as shown in the comparative example of FIG. 4.

Figure 5:
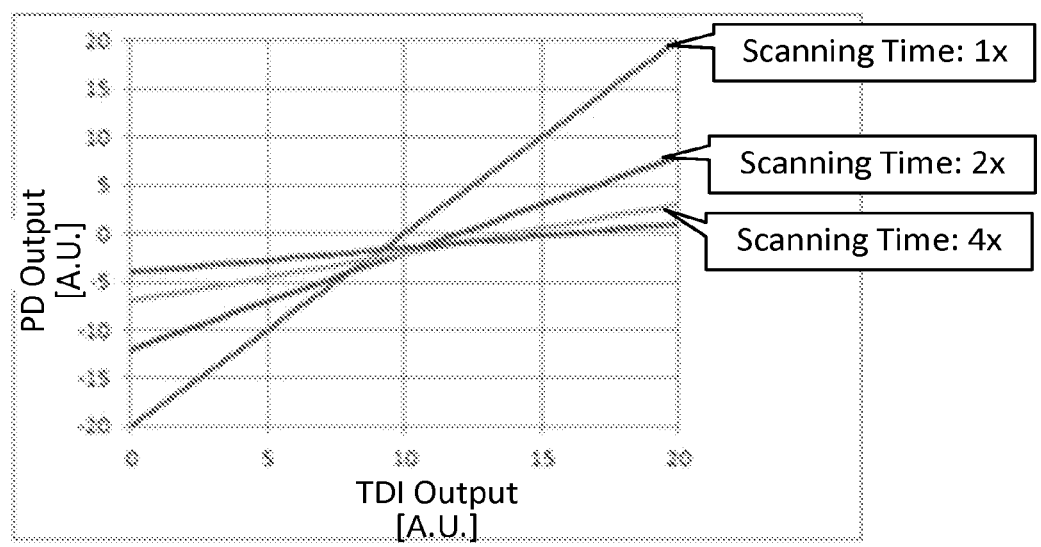
FIG. 5 is a graph individually showing an example of a relation between a PD output and a TDI sensor output with respect to an image accumulation time of an element according to the first embodiment.

FIG. 5 is a graph individually showing an example of a relation between a PD output and a TDI sensor output with respect to an image accumulation time of an element according to the first embodiment. In FIG. 5, the ordinate axis indicates a PD output, and the abscissa axis indicates a TDI sensor output. Although the state of the PD output being negative is also illustrated, it is for virtually extending the straight line in order to show the intercept at the ordinate axis of a linear proportional function. The TDI sensor output here indicates a gray scale value imaged by the photo sensor array 105 (305), and output from the sensor circuit 106 (306). In FIG. 5, the image accumulation time of the element serving as a reference is indicated by the scanning time 1×. FIG. 5 shows, with respect to the image accumulation time of the element serving as a reference, an example of a result of measuring, by experiment and the like, a relation between an output of the PD and an output of the TDI sensor. The relation concerning the scanning time 1× is similar to that of the comparative example of FIG. 4.

The graph of the scanning time 2× shows, with respect to the image accumulation time of the element which is twice the image accumulation time of the element serving as a reference, a result of measuring, by experiment and the like, a relation between a PD output and a TDI sensor output. Further, the graph of the scanning time 4× shows, with respect to the image accumulation time of the element which is four times the image accumulation time of the element serving as a reference, a result of measuring, by experiment and the like, a relation between a PD output and a TDI sensor output. As a result, the TDI output under a dark current is gray scale value 10 in the case of the scanning time 1×, gray scale value 11 in the case of the scanning time 2×, and gray scale value 14 in the case of the scanning time 4×. On the other hand, the gradient of the scanning time 2× is one-half of that of the scanning time 1×, and the gradient of the scanning time 4× is one-fourth of that of the scanning time 1×. Then, according to the first embodiment, a correction term using a TDI output value under a dark current is added to the linear proportional function of the image accumulation time of the element each shown in the comparative example.

For example, in the case of changing the image accumulation time of the element from t1 to t2, and when the TDI output I under a dark current becomes α2 from α1, the PD output E with respect to the TDI output I is defined by the following equation (2) applying the gradient a and the intercept b of the linear proportional function used when the image accumulation time of the element is t1.

$$E=a(t1/t2)\cdot I+b(t1/t2)(\alpha 2/\alpha 1) \qquad (2)$$

Therefore, if the relation between the PD output and the TDI sensor output is measured in advance, by experiment and the like, with respect to the image accumulation time of the element serving as a reference, a linear proportional function of a desired image accumulation time of the element can be obtained by measuring a TDI output value of the desired image accumulation time of the element under a dark current.

Figure 6:
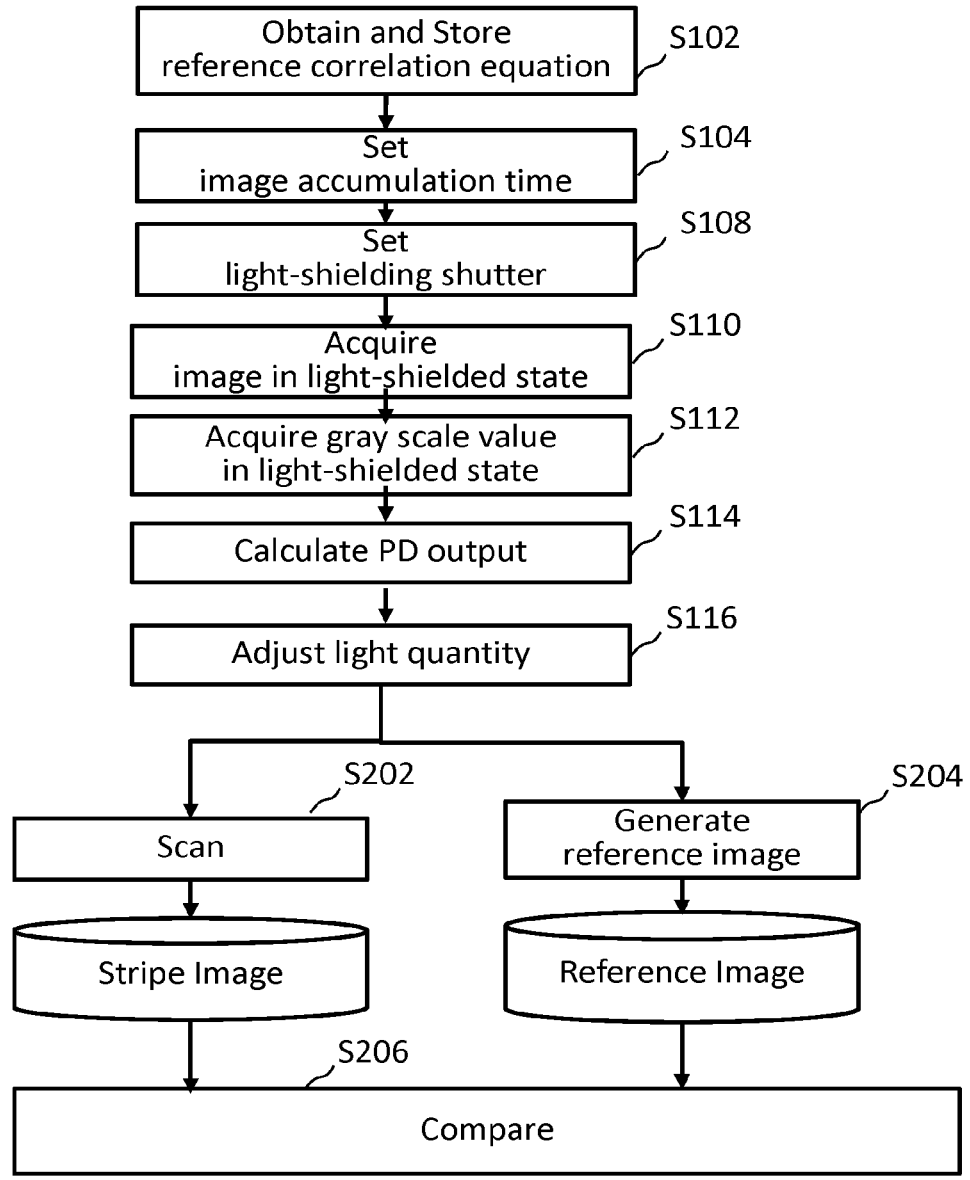
FIG. 6 is a flowchart showing an example of main steps of an inspection method according to the first embodiment.

FIG. 6 is a flowchart showing an example of main steps of an inspection method according to the first embodiment. In FIG. 6, the inspection method of the first embodiment executes a series of steps: a reference correlation equation obtaining and storing step (S102), an image accumulation time setting step (S104), a light-shielding shutter setting step (S108), an image in light-shielded state acquiring step (S110), a gray-scale value in light-shielded state acquiring step (S112), a PD output calculating step (S114), a light quantity adjusting step (S116), a scanning step (S202), a reference image generating step (S204), and a comparing step (S206).

In the reference correlation equation obtaining and storing step (S102), a relation is obtained between a parameter value corresponding to the quantity of a light incident on the photo sensor array 105 (305) and an output value of the photo sensor array 105 (305) in the case where the light is incident based on a reference image accumulation time t1 serving as a reference of the image accumulation time of the photo sensor element. The output value of the PD 310 is used as a parameter value corresponding to the quantity of light incident on the photo sensor array 105. Similarly, the output value of the PD 312 is used as a parameter value corresponding to the quantity of light incident on the photo sensor array 305. Specifically, first, the PD 310 is moved to the inside of the optical path. Then, the light quantity is variably set, and, using a reflected light from the substrate 101, the output value of the PD 310 and the output value of the photo sensor array 105 which employs the reference image accumulation time t1 are measured for each light quantity. The light quantity adjustment mechanism 314 controlled by the light quantity control circuit 134 variably sets the light quantity. When variably setting the light quantity, it is preferable to include a light-shielded state (output value of the PD 310 is zero) where lights from the light source 103 are shielded by the light-shielding shutter, in one of a plurality of light quantities to be set. The output value of the PD 310 is measured by the PD measurement circuit 136. The substrate 101 used in the measurement may be a substrate for inspection, or may be another substrate for evaluation. For example, preferably, measurement using a black portion (light shielding film portion) of the substrate may be performed. It is here sufficient to acquire an output value of the photo sensor array 105 based on the quantity of light incident on the photo sensor array 105. A gray scale value converted in the sensor circuit 106 is used as the output value of the photo sensor array 105. The output value of the PD 310 is measured by the PD measurement circuit 136. Then, using an obtained measured value, a relational expression between the output value of the PD 310 and the output value of the photo sensor array 105 is approximated by fitting.

Figure 7:
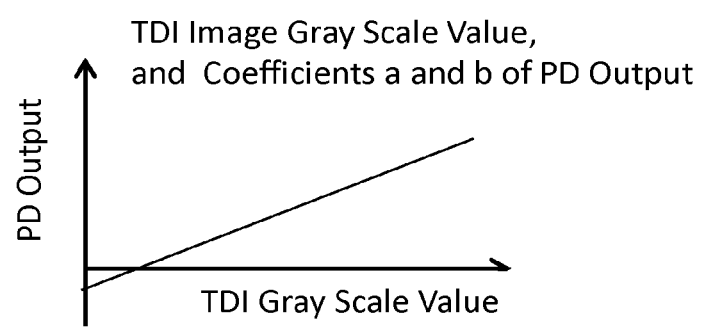
FIG. 7 is a graph showing an example of a relation between a PD output value and a photo sensor array output value according to the first embodiment.

FIG. 7 is a graph showing an example of a relation between a PD output value and a photo sensor array output value according to the first embodiment. FIG. 7 shows the case of approximating using a linear function, for example. The ordinate axis indicates a PD output, and the abscissa axis indicates a TDI gray scale value. The TDI gray scale value is a gray scale value obtained by converting the output of the photo sensor array 105 by the sensor circuit 106. As shown in FIG. 7, the relational expression of y=ax+b can be obtained by approximating using a linear function.

The coefficients a and b of the relational expression are stored in the storage device in the light quantity calculation circuit 132.

Similarly, the PD 312 is moved to the inside of the optical path. Then, the light quantity is variably set, and, using a transmitted light through the substrate 101, the output value of the PD 312 and the output value of the photo sensor array 305 employing the reference image accumulation time t1 are measured for each light quantity. The light quantity adjustment mechanism 314 controlled by the light quantity control circuit 134 variably sets the light quantity. When variably setting the light quantity, it is preferable to include a light-shielded state (output value of the PD 312 is zero) where lights from the light source 103 are shielded by the light-shielding shutter, in one of a plurality of light quantities to be set. For example, preferably, measurement using a white portion (glass portion) of the substrate may be performed. A gray scale value converted in the sensor circuit 306 is used as the output value of the photo sensor array 305. The output value of the PD 312 is measured by the PD measurement circuit 136. Then, using an obtained measured value, a relational expression between the output value of the PD 312 and the output value of the photo sensor array 305 is approximated by fitting. Coefficients a' and b' of the relational expression are stored in the storage device in the light quantity calculation circuit 132. Usually, when the photo sensor arrays 105 and 305 of the same sensitivity are used, coefficients are of the same value. Fitting processing is performed by a processing unit (not shown) in the light quantity calculation circuit 132. Alternatively, it may be performed off-line of the inspection apparatus 100.

Thereby, with respect to the photo sensor element employing the reference image accumulation time t1, the gradient a and the intercept b being coefficients of a linear function equation can be obtained.

Figure 8:
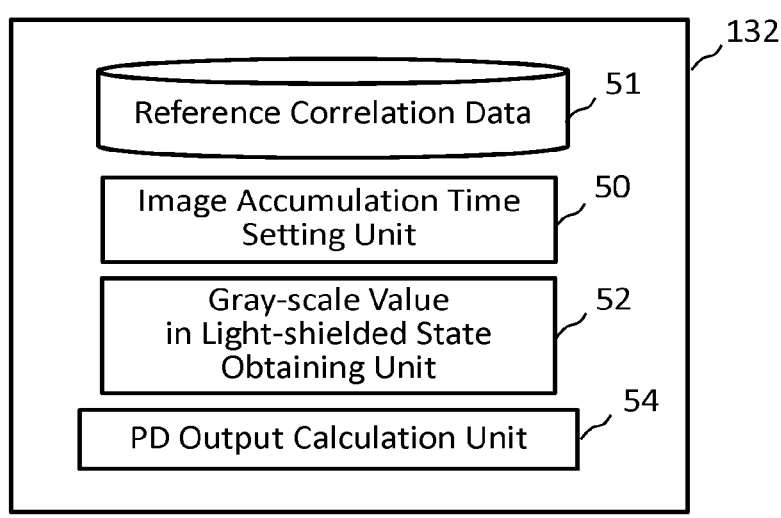
FIG. 8 is a block diagram showing an example of an internal configuration of a light quantity calculation circuit according to the first embodiment.

FIG. 8 is a block diagram showing an example of an internal configuration of a light quantity calculation circuit according to the first embodiment. In FIG. 8, in the light quantity calculation circuit 132, there are arranged a storage device 51 such as a magnetic disk drive, an image accumulation time setting unit 50, a gray-scale value in light-shielded state acquirement unit 52, and a PD output calculation unit 54. Each " . . . unit" such as the image accumulation time setting unit 50, the gray-scale value in light-shielded state acquirement unit 52, and the PD output calculation unit 54 includes processing circuitry. The processing circuitry includes, for example, an electric circuit, computer, processor, circuit board, quantum circuit, semiconductor device, or the like. Common processing circuitry (the same processing circuitry), or different processing circuitry (separate processing circuitry) may be used for each "unit". Input data necessary for the image accumulation time setting unit 50, the gray-scale value in light-shielded state acquirement unit 52, and the PD output calculation unit 54, and operated (calculated) results are stored in a memory (not shown) in the light quantity calculation circuit 132 or the memory 111 each time.

Information, input to the light quantity calculation circuit 132, on the gradient a and the intercept b being coefficients of a linear function equation with respect to the reference image accumulation time t1 of the photo sensor element is stored in the storage device 51.

In the image accumulation time setting step (S104), the image accumulation time setting unit 50 sets a desired image accumulation time t2. Thereby, the image accumulation time t2 of the photo sensor element of the photo sensor arrays 105 and 305 is set. The image accumulation time of the element is equivalent to the imaging time of each photo sensor element per pixel. Then, the image accumulation time of the element is adjusted based on the moving speed of the XYθ table 102 at scan time. If the moving speed of the XYθ table 102 is fast, the image accumulation time of the element becomes short. If the moving speed of the XYθ table 102 is slow, the image accumulation time of the element becomes long.

In the light-shielding shutter setting step (S108), a light-shielding shutter is arranged in the optical path by the light quantity adjustment mechanism 314 controlled by the light quantity control circuit 134. By this, lights from the light source 103 which should reach the photo sensor arrays 105 and 305 are shielded.

In the image in light-shielded state acquiring step (S110), first, the PDs 310 and 312 are moved to the outside of the optical path from the inside. Then, in the state where lights from the light source 103 are shielded by the light-shielding shutter (output values of the PDs 310 and 312 are zero), the optical image acquisition mechanism 150 acquires an optical image of a pattern on the substrate 101. Specifically, an output value of the photo sensor array 105 (305) in the case of light incident on the photo sensor element employing the image accumulation time t2 is measured. There is no need of imaging the entire substrate 101 or the entire one inspection stripe 20. It is sufficient to acquire, while moving the XYθ table 102 at the stage speed corresponding to the set image accumulation time t2 of the set photo sensor element, an image of pixels whose number is the same as the number of photo sensor elements in the integrated direction of the photo sensor arrays 105 and 305. The acquired image data is stored in the stripe pattern memory 123.

In the gray-scale value in light-shielded state acquiring step (S112), the gray-scale value in light-shielded state acquirement unit 52 acquires, from the stripe pattern memory 123, the output value of the photo sensor array 105 (305) in the case of the incident light quantity being zero on the photo sensor element employing the image accumulation time t2. Thereby, the TDI output value α2 under a dark current in the case of the element of the image accumulation time t2 can be acquired.

In the PD output calculating step (S114), the PD output calculation unit 54 (parameter value calculation unit) inputs a desired image accumulation time t2, and corrects the relational expression described above by using the output value α2 of the photo sensor array 105 (305) employing the image accumulation time t2 in the case of the incident light quantity being zero. Here, as shown in the equation (2), the relational expression shown by the equation (1) is corrected using a ratio (t1/t2) and a ratio (α2/α1), where (t1/t2) is a ratio between the reference image accumulation time t1 and the desired image accumulation time t2, and (α2/α1) is a ratio between the output value α1 of the photo sensor array 105 (305) employing the reference image accumulation time t1 in the case of the incident light quantity being zero, and the output value α2 of the photo sensor array 105 (305) employing the desired image accumulation time t2 in the case of the incident light quantity being zero. The output value α1 of the photo sensor array 105 (305) employing the reference image accumulation time t1 in the case of the incident light quantity being zero is acquired from the relational expression between the output of the PD 310 (312), and the output of the photo sensor array 105 (305). Specifically, by inputting the output of the PD 310 as zero, the output of the photo sensor array 105 employing the reference image accumulation time t1 in the case of the incident light quantity being zero can be acquired. Alternatively, if, in the reference correlation equation obtaining and storing step (S102), a light-shielded state (output value of the PD 310 is zero) where lights from the light source 103 are shielded by the light-shielding shutter is included in one of a plurality of light quantities to be set when the light quantity is variably set, the output of the photo sensor array 105 obtained in that case can be used.

Specifically, it operates as follows: First, the relational expression (equation (1)) using the coefficients a and b in the case of the reference image accumulation time t1 of the element is corrected to be the equation (2) by using the ratio (t1/t2) and the ratio (α2/α1). By this, the gradient a(t1/t2) and the intercept b(t1/t2)(α2/α1) can be obtained as coefficients of the linear function equation in the case of the image accumulation time t2 of the photo sensor element.

Then, the PD output calculation unit 54 (parameter value calculation unit) calculates a PD output value E for obtaining a desired output value I of the photo sensor array 105 (305) by using a corrected relational expression. For example, in the case of defining the gray scale value of an image by 256 gray scale levels, the PD output value E for obtaining, for example, 200 gray scale levels is calculated.

In the light quantity adjusting step (S116), first, the PDs 310 and 312 are moved to the inside of the optical path from the outside. Then, the light quantity adjustment mechanism 314 controlled by the light quantity control circuit 134 adjusts the quantity of light incident on the photo sensor array 105 (305) to be a calculated PD output value (parameter value). Since the light quantity adjustment mechanism 314 adjusts the light quantity, based on a combination of a plurality of filter elements having different transmittances, it is acceptable if an error in an allowable range occurs with respect to a target PD output value. For example, an error of ±10% may be included.

Figure 9:
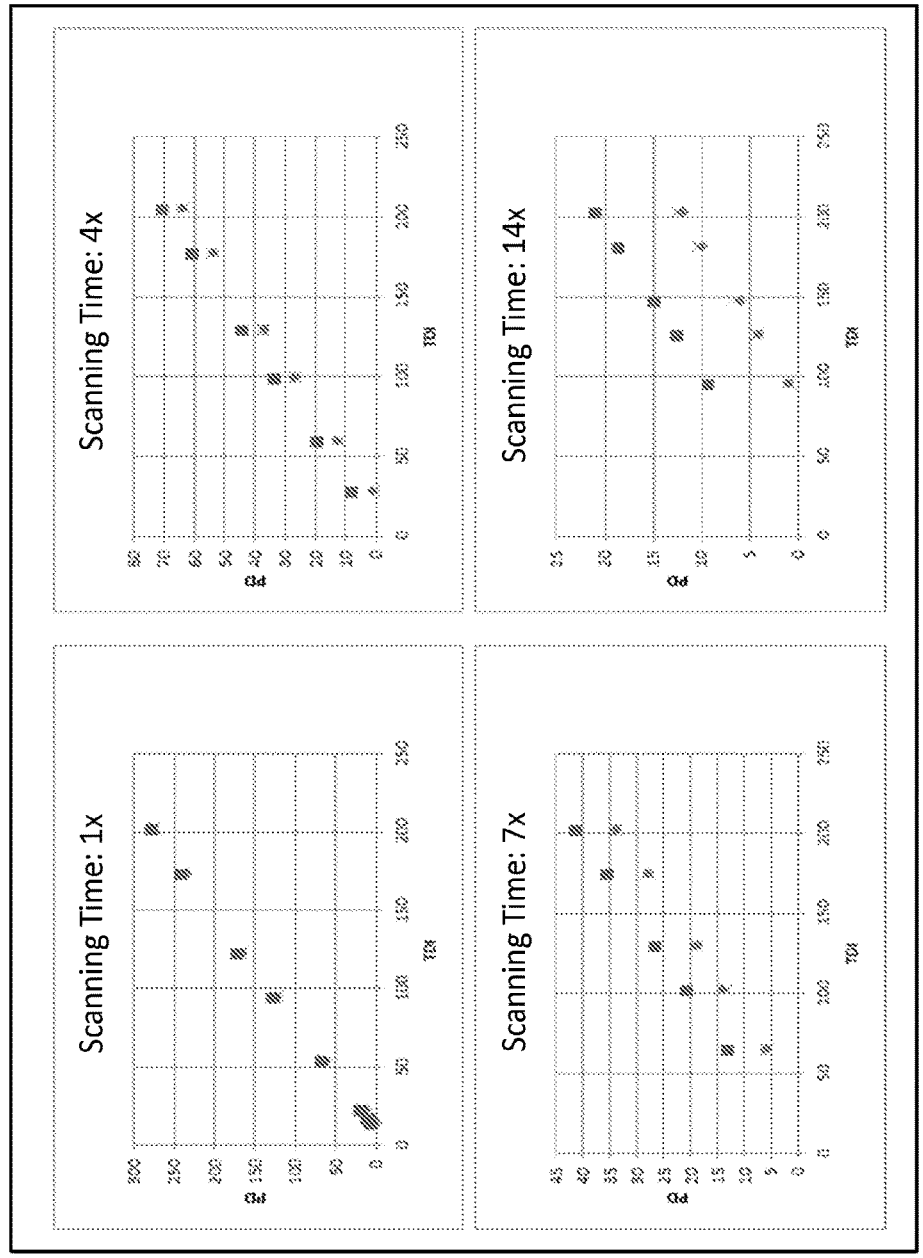
FIG. 9 is a graph showing an example of a relation between a PD output and a TDI output with respect to each image accumulation time of a photo sensor element according to the first embodiment and a comparative example.

FIG. 9 is a graph showing an example of a relation between a PD output and a TDI output with respect to each image accumulation time of a photo sensor element according to the first embodiment and a comparative example. The ordinate axis indicates a PD output, and the abscissa axis indicates a TDI output. A gray scale value converted in the sensor circuit 106 (306) is used as a TDI output. The unit of both the ordinate axis and the abscissa axis is A.U. The scanning time 1× denotes the reference image accumulation time of the photo sensor element. The scanning time 4× denotes the image accumulation time which is four times the reference image accumulation time of the photo sensor element. The scanning time 7× denotes the image accumulation time which is seven times the reference image accumulation time of the photo sensor element. The scanning time 14× denotes the image accumulation time which is fourteen times the reference image accumulation time of the photo sensor element. There are shown an actual measurement (♦) result, a conversion (■) result, and a correction (×) result with respect to each image accumulation time of the photo sensor element. The conversion result indicates a result of simply interpolating the gradient a and the intercept b of the linear relational expression of the reference image accumulation time of the photo sensor element by using the ratio (t1/t2) of the image accumulation time. The correction result indicates a result of correcting, like the first embodiment, the gradient a and the intercept b of the linear relational expression of the reference image accumulation time of the photo sensor element by using the ratio (t1/t2) of the image accumulation time, and further correcting the intercept b(t1/t2) by using the ratio (α2/α1) of the TDI output under a dark current. It turns out as shown in FIG. 8 that the larger the ratio of the image accumulation time becomes, the more the conversion result deviates from the actual measurement result. In contrast, deviation of the correction result corresponding to the first embodiment from the actual measurement value keeps small regardless of the ratio of the image accumulation time.

By performing the preprocessing described above, the light quantity adjustment in the case of changing the image accumulation time of the element is completed. Then, it proceeds to an actual inspection processing operation.

In the scanning step (S202), the optical image acquisition mechanism 150 acquires an image of the substrate 101 by the photo sensor arrays 105 and 305 on which an adjusted quantity of light is incident, and outputs optical image data of the acquired image. First, the optical image acquisition mechanism 150 scans the inspection stripe 20 with laser beams (inspection light) so as to acquire, for each inspection stripe 20, an image of the stripe region by the photo sensor array 105 (305). Specifically, it operates as follows: The XYθ table 102 is moved to the position where a target inspection stripe 20 can be image-captured. In a transmission inspection, a light having passed through the substrate 101 is focused to form an optical image and incident on the photo sensor array 305. Alternatively or further, in a reflection inspection, a reflected light from the substrate 101 is focused to form an optical image and incident on the photo sensor array 105.

A pattern image focused/formed on the photo sensor array 105 is photoelectrically converted by each photo sensor element of the photo sensor array 105, and further, analog-to-digital (A/D) converted by the sensor circuit 105. At this process, the output after integration of a plurality of photo sensor elements arrayed in the scanning direction is converted to a gray scale value by the sensor circuit 105, and output to the stripe pattern memory 123.

Alternatively or further, a pattern image focused/formed on the photo sensor array 105 is photoelectrically converted by each photo sensor element of the photo sensor array 305, and further, analog-to-digital (A/D) converted by the sensor circuit 305. At this process, the output after integration of a plurality of photo sensor elements arrayed in the scanning direction is converted to a gray scale value by the sensor circuit 305, and output to the stripe pattern memory 123.

Data of a pixel value of the inspection stripe 20 to be measured is stored in the stripe pattern memory 123. Measurement data (pixel data) is, for example, 8-bit unsigned data, and indicates a gray scale level of brightness (light quantity) of each pixel.

In the reference image generating step (S104), the reference image generation circuit 112 generates a reference image serving as a reference, using figure pattern data (design data). Generating a reference image is carried out, for each inspection stripe 20, in parallel to the scanning operation of the inspection stripe 20 concerned. Specifically, it operates as follows: The reference image generation circuit 112 inputs figure pattern data (design data) with respect to each frame region 30 of the target inspection stripe 20, and converts each figure pattern defined by the input figure pattern data into image data of binary or multiple values.

Basic figures defined by the figure pattern data are, for example, rectangles and triangles. For example, figure data is stored which defines the shape, size, position, and the like of each pattern figure by using information, such as coordinates (x, y) of the reference position of the figure, lengths of sides of the figure, and a figure code serving as an identifier for identifying the figure type such as rectangles, triangles and the like.

When design pattern data used as the figure data is input to the reference image generation circuit 112, the data is developed into data of each figure. Then, the figure code, the figure dimensions, and the like indicating the figure shape of each figure data are interpreted. Then, the reference image generation circuit 112 develops each figure data to design pattern image data of binary or multiple values as a pattern to be arranged in squares in units of grids of predetermined quantization dimensions, and outputs the developed data. In other words, the reference image generation circuit 112 reads design data, calculates the occupancy of a figure in the design pattern, for each square region obtained by virtually dividing the frame region into squares in units of predetermined dimensions, and outputs n-bit occupancy data (design image data). For example, it is preferable to set one square as one pixel. Assuming that one pixel has a resolution of $1/2^8(=1/256)$, the occupancy rate in each pixel is calculated by allocating sub regions each being $1/256$ to the region of a figure arranged in the pixel. Then, it becomes 8-bit occupancy data. Such square regions (inspection pixels) can be corresponding to pixels of measured data.

Next, the reference image generation circuit 112 performs filtering processing, using a filter function, on design image data of a design pattern which is image data of a figure.

Figure 10:
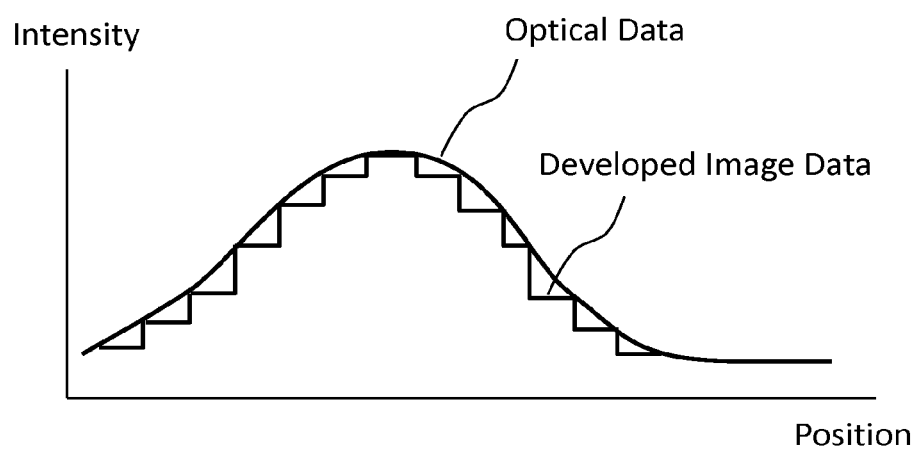
FIG. 10 is a graph illustrating filter processing according to the first embodiment.

FIG. 10 is a graph illustrating filter processing according to the first embodiment. Pixel data of an optical image acquired from the substrate 101 is in a state affected by filtering due to resolution characteristics etc. of the optical system used for image-capturing, in other words, in an analog state continuously changing. Therefore, for example, as shown in FIG. 10, the optical image is different from the developed image (design image) whose image intensity (gray scale value) is represented by digital values. On the other hand, in figure pattern data, since pattern codes, etc. are used for defining as described above, image intensity (gray scale level) of developed design images may be digital values. Accordingly, the reference image generation circuit 112 performs image processing (filter processing) on the developed image in order to generate a reference image close to the optical image. Thereby, it is possible to match design image data being design side image data, whose image intensity (gray scale level) is in digital values, with image generation characteristics of measured data (optical image). The generated reference image is output to the comparison circuit 108.

Figure 11:
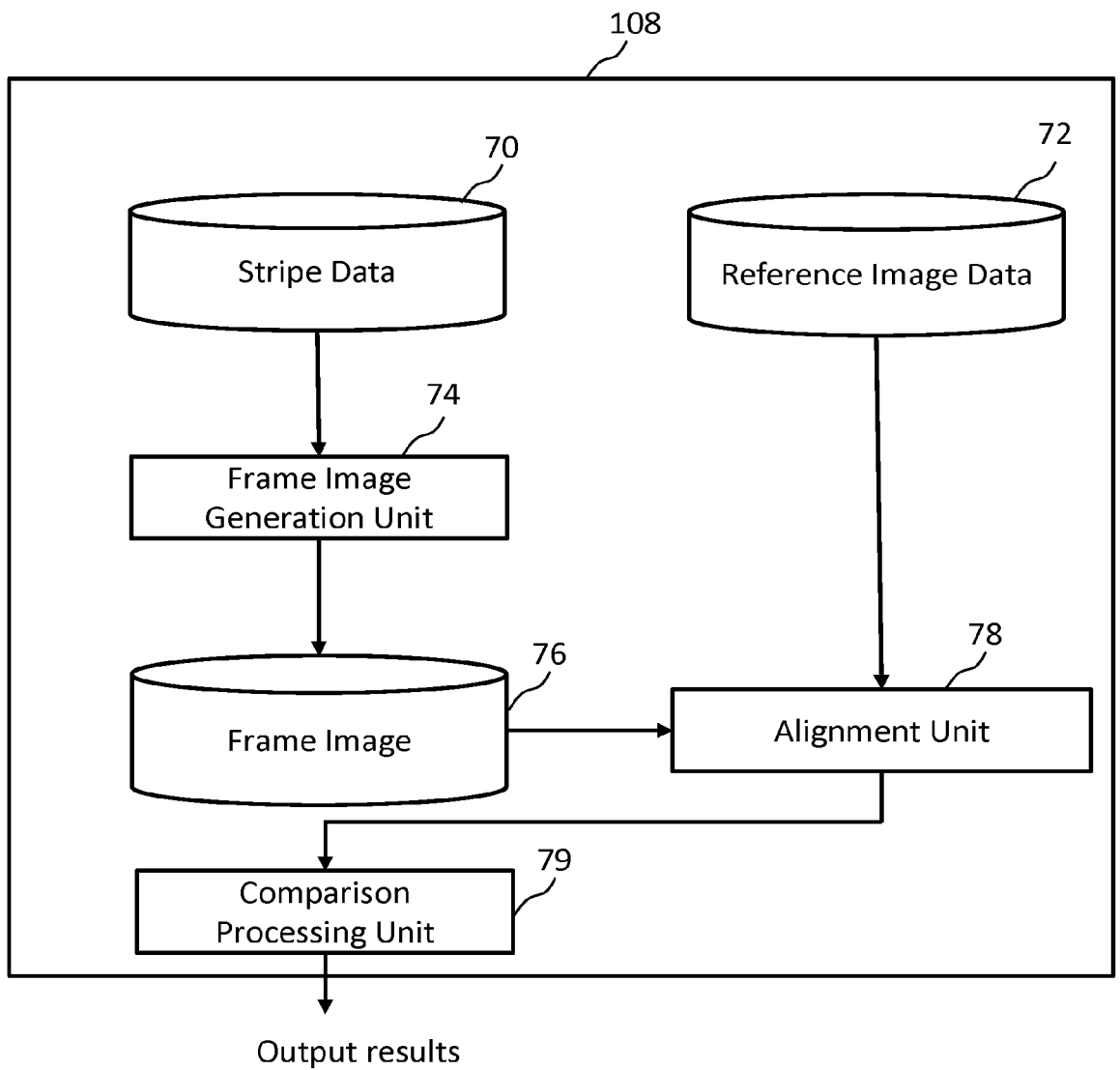
FIG. 11 shows an example of the internal configuration of a comparison circuit according to the first embodiment.

FIG. 11 shows an example of the internal configuration of a comparison circuit according to the first embodiment. As shown in FIG. 11, in the comparison circuit 108, there are disposed storage devices 70, 72, and 76 such as magnetic disk drives, a frame image generation unit 74, an alignment unit 78, and a comparison processing unit 79. Each of the "units" such as the frame image generation unit 74, the alignment unit 78, and the comparison processing unit 79 includes processing circuitry. The processing circuitry includes, for example, an electric circuit, a computer, a processor, a circuit board, a quantum circuit, semiconductor device, or the like. Further, common processing circuitry (the same processing circuitry), or different processing circuitry (separate processing circuitry) may be used for each of the " . . . units". Input data required in the frame image generation unit 74, the alignment unit 78, and the comparison processing unit 79, and calculated (operated) results are stored in a memory (not shown) in the comparison circuit 108 or in the memory 111 each time.

Stripe data (stripe region image) input to the comparison circuit 108 is stored in the storage device 70. Reference image data input to the comparison circuit 108 is stored in the storage device 72.

In the comparing step (S206), the comparison circuit 108 (example of a comparison unit) compares an optical image and a reference image which are configured by optical image data output from the TDI sensor 105. Specifically, it operates as follows:

In the comparison circuit 108, first, the frame image generation unit 74 generates a plurality of frame images 31 by dividing the stripe region image (optical image) by a predetermined width. Specifically, as shown in FIG. 2, the stripe region image is divided into frame images of a plurality of rectangular frame regions 30. For example, it is divided into the size of 512×512 pixels. Data of each frame region 30 is stored in the storage device 76.

Next, the alignment unit 78 reads, for each frame region 30, a corresponding frame image 31 and a corresponding reference image from the storage devices 72 and 76, and performs alignment (position adjustment) of the frame image 31 and the corresponding reference image based on a predetermined algorithm. For example, the alignment is performed according to the least-square method.

The comparison processing unit 79 (another example of the comparison unit) compares the frame image 31 with the reference image corresponding to the frame image 31 concerned. For example, comparing is performed for each pixel. Here, the comparison processing unit 79 compares, for each pixel, both the images based on predetermined determination conditions in order to determine whether there is a defect, such as a shape defect, or not. For example, based on predetermined algorithm as the determination conditions, both the images are compared each other for each pixel to determine whether there is a defect or not. For example, for each pixel, a difference value between pixel values of the optical image and the reference image is calculated, and it is determined there is a defect when the difference value is larger than a threshold Th. Then, the comparison result is output to, for example, the magnetic disk drive 109, the magnetic tape drive 115, the flexible disk drive (FD) 116, the CRT 117, or the pattern monitor 118, or alternatively, output from the printer 119.

Although the case of performing the die-to-database inspection is described in the above example, the die-to-die inspection may also be used. In that case, with respect to frame regions of dies 1 and 2 for the die-to-die inspection in a plurality of frame regions 30, the comparison circuit 108 uses a frame image (optical image) of the die 2, as a reference (reference image). First, for each frame region 30 to which the die-to-die inspection is performed, the alignment unit 78 reads the frame image 31 of the die 1 and a corresponding frame image of the die 2 from the storage device 76, and performs alignment between the frame image 31 of the die 1 and the frame image of the die 2 based on a predetermined algorithm. For example, the alignment is performed according to the least-square method. Then, for each frame region 30 to which the die-to-die inspection is performed, the comparison processing unit 79 (comparison unit) compares, for each pixel, the frame image 31 of the die 1 with the corresponding frame image of the die 2.

As described above, according to the first embodiment, it is possible to adjust the light quantity of an inspection light incident on an imaging sensor so that an image of a desired gray scale value may be acquired with respect to the image accumulation time of a desired element. Therefore, degradation of images resulting from the change of the image accumulation time can be inhibited.

Embodiments have been explained referring to specific examples described above. However, the present invention is not limited to these specific examples.

While the apparatus configuration, control method, and the like not directly necessary for explaining the present invention are not described, some or all of them can be appropriately selected and used on a case-by-case basis when needed. For example, although description of the configuration of the control unit for controlling the inspection apparatus 100 is omitted, it should be understood that some or all of the configuration of the control unit can be selected and used appropriately when necessary.

Further, any image acquisition method, image acquisition apparatus, pattern inspection apparatus, and pattern inspection method that include elements of the present invention and that can be appropriately modified by those skilled in the art are included within the scope of the present invention.

Additional advantages and modification will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image acquisition method comprising:
   storing, in a storage device, a coefficient of a relational expression between a parameter value corresponding to a quantity of light incident on an imaging sensor including a photo sensor element and an output value of the imaging sensor in a case of the light incident on the imaging sensor which employs a reference image accumulation time serving as a reference of an image accumulation time of the photo sensor element;
   inputting a desired image accumulation time, and calculating a parameter value for obtaining a desired output value of the imaging sensor by using a corrected relational expression which is obtained by correcting the relational expression by using an output value of the imaging sensor employing the desired image accumulation time in a case of the quantity of light incident being zero;
   adjusting the quantity of light incident on the imaging sensor to be a calculated parameter value; and
   acquiring an image of a target object by the imaging sensor on which an adjusted quantity of light is incident, and outputting image data of the image acquired.

2. The method according to claim 1, wherein, as the coefficient of the relational expression, a gradient and an intercept approximated by a linear function are used.

3. The method according to claim 1, further comprising:
   correcting the relational expression by using a ratio between the reference image accumulation time and the desired image accumulation time, and a ratio between the output value of the imaging sensor employing the reference image accumulation time in the case of the quantity of light incident being zero, and the output value of the imaging sensor employing the desired image accumulation time in the case of the quantity of light incident being zero.

4. The method according to claim 1, further comprising:
   arranging a light-shielding shutter in an optical path.

5. The method according to claim 4, further comprising:
   measuring the output value of the imaging sensor which employs the desired image accumulation time in a state where the light-shielding shutter is arranged in the optical path.

6. The method according to claim 5, wherein the output value of the imaging sensor employing the reference image accumulation time in the case of the quantity of light incident being zero is obtained from the relational expression.

7. The method according to claim 5, wherein, as the output value of the imaging sensor employing the reference image accumulation time in the case of the quantity of light incident being zero, a value measured in obtaining the relational expression is used.

8. An image acquisition apparatus comprising:
   an imaging sensor configured to include a photo sensor element;
   a storage device configured to store a coefficient of a relational expression between a parameter value corresponding to a quantity of light incident on the imaging sensor and an output value of the imaging sensor in a case of the light incident on the imaging sensor which employs a reference image accumulation time serving as a reference of an image accumulation time of the photo sensor element;
   a parameter value calculation circuit configured to input a desired image accumulation time, and to calculate a parameter value for obtaining a desired output value of the imaging sensor by using a corrected relational expression which is obtained by correcting the relational expression by using an output value of the imaging sensor employing the desired image accumulation time in a case of the quantity of light incident being zero; and
   a light quantity adjustment mechanism configured to adjust the quantity of light incident on the imaging sensor to be a calculated parameter value, wherein
   an image of a target object is acquired by the imaging sensor on which an adjusted quantity of light is incident, and image data of the image acquired is output.

9. The apparatus according to claim 8, further comprising:
a gray-scale value in light-shielded state acquirement circuit configured to acquire the output value of the imaging sensor employing the desired image accumulation time in the case of the quantity of light incident being zero.

10. The apparatus according to claim 8, wherein the relational expression is corrected by using a ratio between the reference image accumulation time and the desired image accumulation time, and a ratio between the output value of the imaging sensor employing the reference image accumulation time in the case of the quantity of light incident being zero, and the output value of the imaging sensor employing the desired image accumulation time in the case of the quantity of light incident being zero.

* * * * *